INVENTORS
WALTER WILL
HEINZ GEIST
KARLHEINZ KREBS

BY Stevens, Davis, Miller & Mosher
ATTORNEYS

United States Patent Office 3,427,455
Patented Feb. 11, 1969

3,427,455
APPARATUS FOR NEUTRON SELECTION BY MEANS OF ROTATING SWITCH ROTOR
Walter Will, Taino, Heinz Geist, Lentate di Sesto Calende, and Karlheinz Krebs, Ispra, Italy, assignors to European Atomic Energy Community (Euratom), Brussels, Belgium
Filed Apr. 25, 1966, Ser. No. 545,119
U.S. Cl. 250—105                    9 Claims
Int. Cl. H01j 35/16; G21f 5/02

ABSTRACT OF THE DISCLOSURE

An apparatus for neutron selection comprising a neutron chopper whose rotor is vertically suspended and driven from a drive motor by a flexible drive shaft, a cradle means adapted to receive and to rotatably support the rotating rotor upon the unexpected occurrence of a rupture in said shaft.

Figure 1:
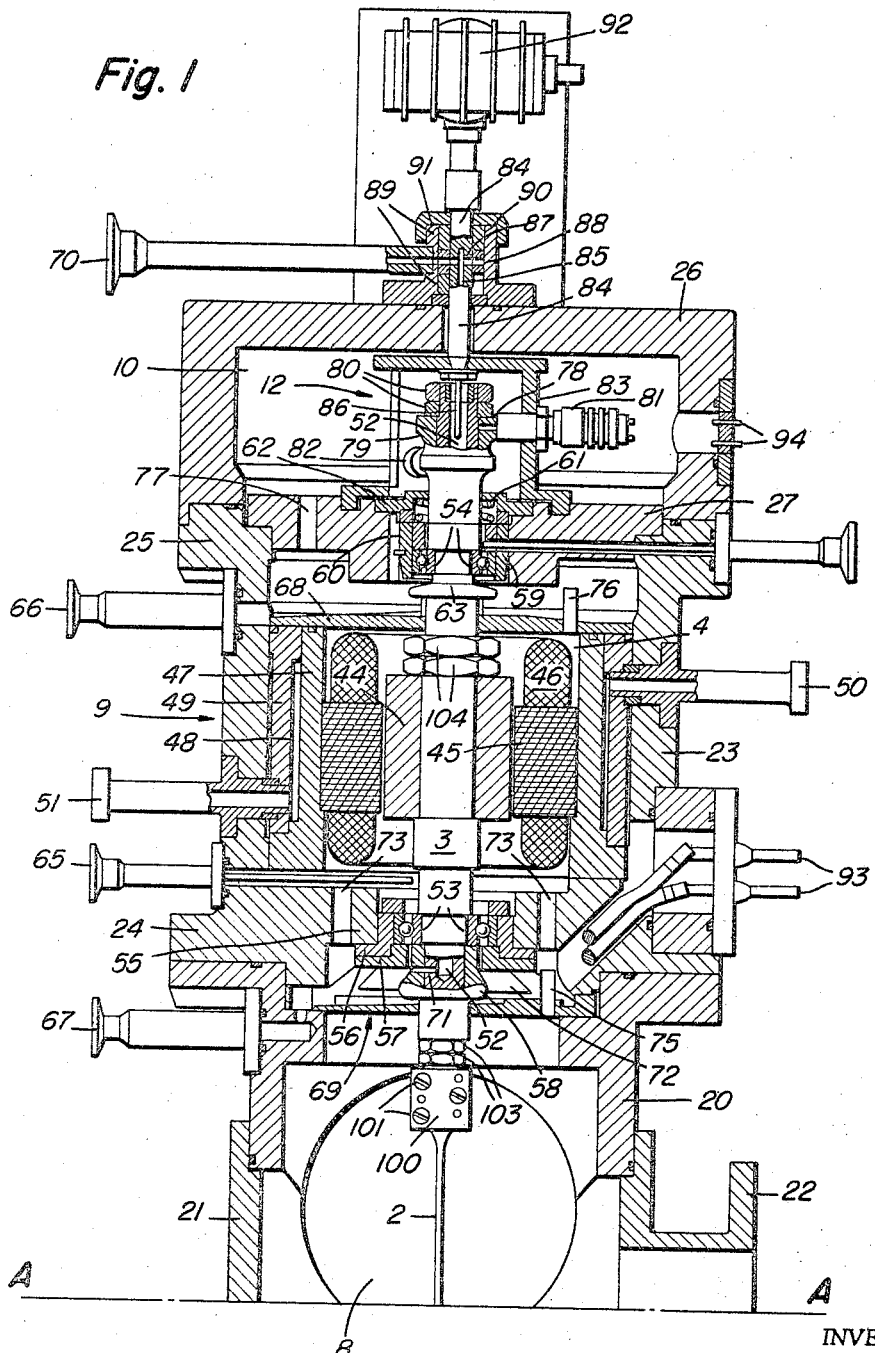

For a number of neutron-physical measurements, it is necessary to select neutrons of specific energies from a beam of neutrons. Such a selection is possible in the range between $10^{-4}$ ev. and 1 mev. by rotating mechanical switches, so called neutron choppers or selectors.

A review of the status of neutron chopper technique is given, for instance, in the article by P. A. Egelstaff "General Review of Neutron Techniques" published in the book Neutron Time-of-Flight Methods published by Euratom, Brussels, September 1961.

The present invention relates to a neutron chopper with a switch rotor which is driven by an electric motor and is freely suspended by a flexible shaft from the shaft of the electric motor. The upper end of the motor shaft bears means for producing a phase-angle signal. At the lower end of the rotor there is centrally located a spindle which extend loosely into a liquid dampening support.

Neutron choppers are set up in the experiment in the alignment between the neutron source and the detectors. In the case of double chopper systems, the first chopper produces neutron pulses of given frequency while the second chopper defines the neutron energy. As source of neutrons, a nuclear reactor is generally used. The choppers are intended to separate the neutrons in accordance with their energies and make the resultant radiation as well as the background of rapid neutrons, ineffective biologically and with respect to the measurements.

The present neutron chopper is intended for operation in a double chopper system. Accordingly, it has a heavy rotor (about 34 kg. with 30 cm. diameter) and operates in a speed range of 4000 to 25,000 r.p.m. It differs from the known choppers in accordance with the invention in that all operating parts operate in a housing under vacuum and that three separate emergency cradle devices are provided for catching and stabilizing the rotating rotor upon its suspension means being broken, said devices respectively acting on the rotor body and the rotor spindles. As a result of these measures, the stringent safety requirements as to operation of neutron choppers, in view of the long measurement times, are excellently satisfied.

In the known chopper systems, the rotor alone is placed in the vacuum so that at all times a vacuum lead through for the drive shaft to the rotor is required. Vacuum lead throughs for shafts rotating at high speed are, however, subject to very great wear, are not perfected and thus, particularly in continuous operation, do not prevent entrance of air into the rotor chamber. Air imposes a braking action of such magnitude that the flexible shaft transmitting the motor torque to the rotor is invariably sheared off. The system thus becomes inoperable and the rotor becomes a source of danger from explosion due to the enormous uncontrolled centrifugal forces therein. Total encapsulation in a vacuum eliminates this danger as regards the entry of air. The separate cradle devices for rotor body and rotor spindles have the purpose of stabilizing the rotor in case of breakage of its flexible suspension drive shaft while rotating at high speed and with high centrifugal forces (up to 100 meter tons) even if either of the rotor spindles should shear with the rotor detached from the flexible suspension shaft.

An object of this invention, therefore, is to provide a neutron chopper which is less susceptible than previously known choppers to the leakage of air into the vacuum compartments housing the rotating parts thereof, this being achieved through a chopper wherein the respective vacuum compartments all form interconnecting parts of a common vacuum housing.

A further object of this invention is to provide an emergency cradle means for catching and stabilizing the rotor or portions thereof pursuant to a rupture in the suspension means therefor and while they are rotating at high speeds.

A further object of this invention is to provide a cradle means as stated above which serves to maintain the rotor and all portions thereof rotating about the normal rotational axis despite the fact that the rotor support and guide means may have ruptured and therefore no longer be effective.

A further object of this invention is to provide a cradle means as stated above which serves to prevent the rotating parts from striking against any stationary portion of the apparatus housing pursuant to a rupture in the normal rotor support and guide means.

Figure 1A:
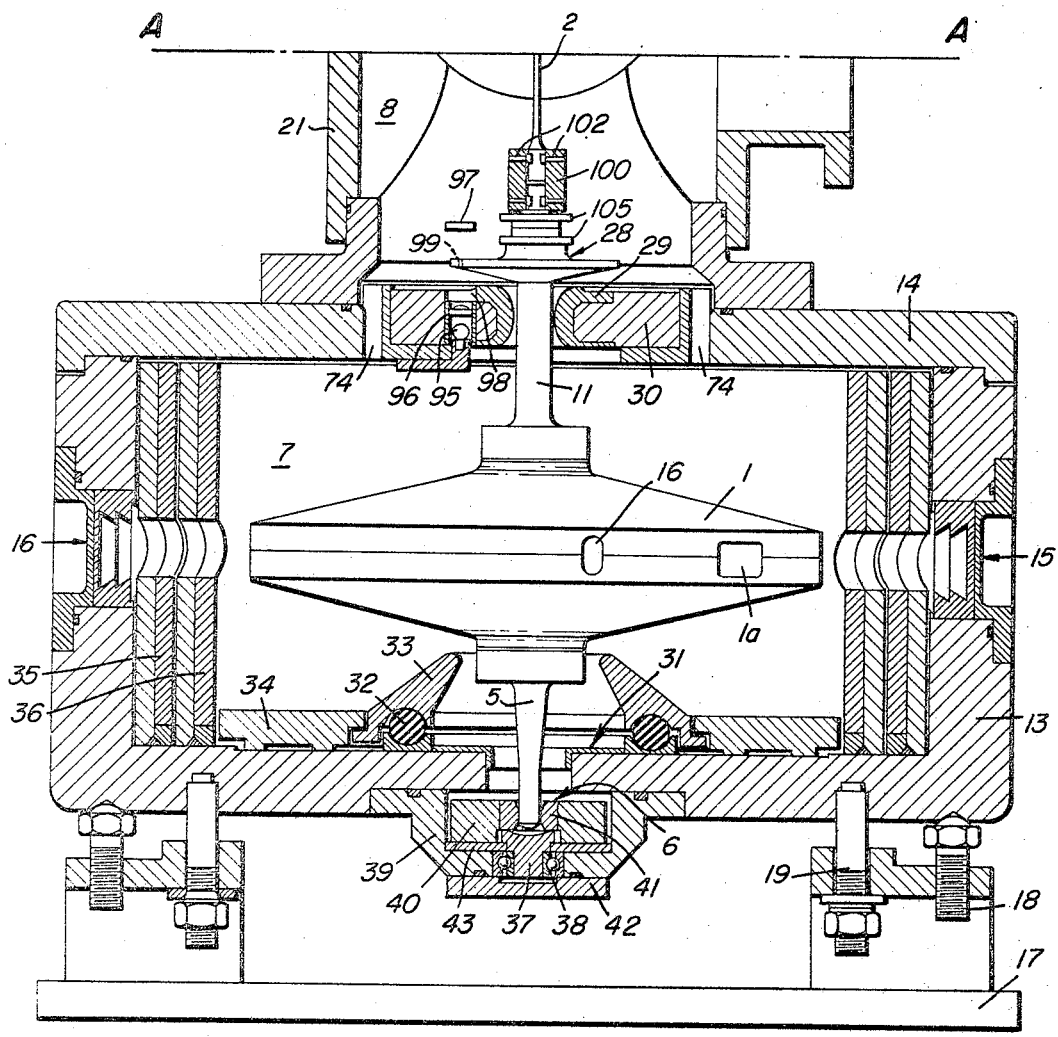

The foregoing and other objects of the invention will become apparent from the following detailed description thereof which is referred to the accompanying drawings, wherein:

FIGURE 1 is a vertical sectional view of the upper portion of a neutron chopper according to the invention, said chopper having been cut off along horizontal line A—A because of spare limitations on the sheet of drawing; and, FIGURE 1(A) is a continuation of FIGURE 1 showing the lower portion of the chopper commencing at line A—A in FIGURE 1.

The neutron chopper in accordance with the invention is shown in vertical section in the drawing, certain structural parts having been shifted into the plane of the drawing for better visibility.

With reference to FIGURE 1A, the Monel switch rotor 1, hereinafter referred to simply as the rotor, is arranged as all other operating parts in a multi-partite housing of cylindrical symmetry. It is suspended freely by means of the flexible shaft 2 on the shaft 3 (FIGURE 1) of the electric motor. In operation, the housing is evacuated down to $10^{-4}$ mm. Hg. At the lower end the spindle 5 (FIGURE 1) of the rotor extends loosely into the liquid damping bearing 6. The rotor consists of two symmetrical halves whose plane of symmetry is bridged by three switch channels, such as the two channel openings 1a, 1b (FIGURE 1A).

The apparatus housing, as already mentioned, encloses all operating parts of the chopper. It consists of the four communicating chambers 7 to 10 lying one above the other, the lower one 7 receiving the rotor 1, the next higher one 8 the flexible shaft 2 with the coupling ends of the motor shaft 3 and the rotor shaft 11, the following one 9 the electric drive motor 4, and the upper one 10 the phase-transmitting device 12. Chambers 7 and 8 are shown in FIGURE 1A while chambers 9 and 10 are shown in FIGURE 1.

For rotor body and each of the rotor spindles 5 and 11, separate cradle devices are provided; their construction and manner of operation will be discussed in detail later on.

With reference to FIGURE 1A, the rotor chamber consists of the pot-shaped bottom part 13 and the cover 14 which is crewed to the bottom part. The side wall is provided with vacuum tight neutron passage windows 15, 16. The bottom part is fitted on and anchored to the base 17 by means of the adjusting and anchoring screws 18, 19.

The housing chamber 8 is formed of the flanged box member 20 of square cross-section which has in its walls passage openings, three of which are closed by covers such as 21. On the fourth opening the flanged connection 22 is arranged for the connection of a vacuum pump. The chamber 8 allows for convenient operation of the flexible shaft 2, and due to its special coupling means, it allows for replacement of the shaft without separating other structural parts of the chopper.

With reference to FIGURE 1, the housing chamber 9 (motor chamber) is formed of the cylindrical body 23 which has connecting flanges 24, 25. The chamber 10 (transmitter chamber) which follows the chamber 9 consists of the upper pot part 26 and the bottom plate 27.

All the housing structural parts above mentioned, are screwed together and made vacuum tight by special packing rings in the joints, represented by the solid line rectangles.

In the following only the construction and manner of operation of the rotor cradle devices in accordance with the invention will be described.

With reference to FIGURE 1A, the cradle device which acts on the rotor upper spindle 11 consists essentially of the plate 28 which is conically beveled at the bottom, and of the bearing 29 of babbitt metal which lines the shaft passage opening of the bottom plate 30. The bearing 29 stabilizes the rotor at the upper end in case of breakage of the flexible shaft. Babbitt metal has good lubricating properties so that the detached rotor shaft extending through the bearing slows down without vibration to a lower speed of rotation. The plate 28 enters into operation should the rotor lower spindle 5 shear off, plate 28 supporting the rotor from the top bearing 29. The aforementioned bottom plate 30 is fastened by screws in the cover of the rotor chamber.

The cradle device which is engageable with the rotor body itself consists of three parts, namely the centering ring 31, the rubber ring 32 and the collar 33 of bronze. The latter is held down by the plate 34 screwed to the bottom of the rotor chamber. Peripherally around the plate the two ring packages 35, 36 are inserted into the chamber. They serve as armor for the chamber. The packages consist in each case of one lead ring and one steel ring.

The cradle device 31–33 enters into action if the rotor spindle 5 and the rotor spindle 11 or their respective fastening screws should shear off. The rotor then as a matter of fact falls freely onto the collar 33 and depending on the orientation of the impinging rotor, the collar 33 yields elastically due to the fact that it is supported on the rubber ring 32. In this way there is made possible a full cradling of the rotor on a concentric bearing surface.

The cradle device which is engageable with the rotor spindle 5 finally consists of the cast iron seat 37; which is rotatably supported in the ball bearing 38. In case of damage, the lever end face of spindle 5 engages the seat 37 with point contact and slows down the spindle relatively without friction since the seat can turn with it. Since the seat, furthermore, consists of cast iron and the rotor pivot of steel, the danger of the seizing or welding together of the pivot and seat is eliminated. The distance between the bottom of the seat and the point of the pivot is 1 mm.

The seat 37 is arranged centrally in the pan 39 of the rotor chamber. The pan is filled with oil and contains a damper plate 40 which is bored through in the center and lined along the borehole with babbitt metal 41. Upon the starting of the rotor it dampens, via the rotor pivot, any deflection movements which occur if the rotor is out of its proper alignment. A cover 42 closes off the pan from the bottom while a bottom plate 43 forms a slide surface for the damper plate 40. For the sake of completeness, the structural and operating parts of the chopper which have not yet been described will now be explained. With reference to FIGURE 1, the electric drive motor of the chopper is a two-pole, three-phase reluctance motor having a power of 1.5 kw. and a maximum speed of rotation of 40,000 r.p.m. at 150 volts. Its winding-less rotor 44 is constructed as a bundle of laminations in a squirrel cage and is flattened peripherally. Its stator 45 also consists of a bundle of laminations and bears a three-phase high-frequency winding 46. The stator is held by the fitting 47.

Between the fitting 47 and the housing wall 23 there is created a cooling space 48 with the bushing 49 as outer wall. Through the cooling space water flows by means of the inlet and outlet connections 50, 51. The motor rotor is also cooled. For this purpose the motor shaft has a blind hole bore 52 (see upper and lower shaft ends) into which oil is conducted.

Also with reference to FIGURE 1, the drive shaft is supported axially in the two precision ball bearings 53, 54, the bearing 53 (bottom) being a fixed bearing and the bearing 54 (top) a loose bearing. The fixed bearing 53 is seated in the bottom 55 of the motor chamber 9, and the loose bearing 54 is seated in corresponding manner in the bottom plate 27 of the transmitting chamber 10. The outer ring of the fixed bearing 53 is held by the bushings 56, 57 which are screwed onto the chamber bottom 55. The inner ring of the fixed bearing is seated above the collar 58 on the motor shaft. The outer ring of the loose bearing 54 is seated, secured by a snap ring in the bearing bushing 59 which in its turn is seated in a sliding but non-rotatable manner in the central bore of the bottom plate 27. The bushing contains an auxiliary bushing 60 against which the coil spring 61 presses. The coil spring in its turn rests against the closure cover 62. The spring forces, therefore, act via the bushings 59, 60 and the balls of the ball bearing on the inner ring of the bearing. The bearing can thus move away axially in cases of changes in length of the motor shaft. Below the loose bearing is the screw cap ring 63. The bearings are lubricated by separate oil circuits comprising the inlet connections 64 and 65 and the outlet connections 66 and 67.

The cap rings 58 and 63 have oil sling beads. In order to prevent the oil which is slung off from penetrating into the joints of the motor shaft, beveled intermediate covers 68 and 69 are arranged above and below the motor.

The cooling oil for the motor rotor passes through the inlet connection 70 (at the top in FIGURE 1) into the said blind hole bore of the drive shaft, and emerges again via the radial bore 71 (near the bottom in FIGURE 1) and the adjacent oil outlet connection 67. A conical impact plate 72 above the cap ring 58 protects the evacuation channels 73 in the bottom of the housing 9. Similar evacuation channels are provided in the other partition walls of the chopper housing such as 74 to 77.

The aforementioned phase angle signal is produced by three soft iron pins at the end of the drive shaft, one of which 78 is visible in FIGURE 1 in its holding bushing 79 of non-magnetic material. The bushing is secured on the motor shaft by lock-nuts 80. The pins are the pulse triggers of the magnetic transducers 81 and 82 which are mounted in the rotatable box 83. The box is placed in the manner of a hat over the end of the motor shaft and is provided on top with the outward extending adjusting shaft 84. At the bottom it is seated loosely in the bottom plate 28.

The adjusting shaft has a central bore hole 85 which is continued at the lower end as a small tube 86. This small tube opens without contact into the blind hole bore of the motor shaft. The central bore 85 is in communication via corresponding radial bore holes 87 and the groove distributor ring 88 with the oil inlet connection 70. On both faces of the distributor ring 88 there are seated Simmer (sealing) rings 89, all said parts being received by the flanged bushing 90.

A cover 91 is screwed onto the flanged bushing. The said adjusting shaft 84 is connected to the gearing 92 of the adjustment motor. The feed and control circuit of the double chopper system is constructed as follows: a controllable HF-generator feeds two rotary transformers, the secondary sides of which are connected to the respective windings of the chopper motors. The secondary winding of one of the rotary transformers is adjusted as a function of an adjusting motor while the secondary winding of the other rotary transformer is manually displaceable.

The above mentioned transmitting transducers are connected to a common phase comparison member, the output signal of which controls the adjusting motor. The control signal arrives in case of a difference in the mutual angular position adjusted for the rotors. The difference may be accidental or else intended. In the latter case, angle adjustment by box 83, the adjusting motor displaces the rotary transformer until the angular position of the one rotor differs by the desired amount from that of the other rotor. At this moment, the control signal at the output of the phase comparison member becomes equal to zero. The connecting terminals for the motor and the transducers of this chopper are designated 93 and 94.

In the case of the chopper system shown, the torsion of the flexible shaft 2 from which the rotor is suspended can also be measured. For this purpose there is installed in the cover 14 of the rotor chamber a photoelectric measuring device which consists of the incandescent lamp 95 with focusing lens 96 and the photocell 97. The incandescent lamp with lens is installed in a mounting channel 98 of the bottom plate 30 (FIGURE 1A) while the photocell is held in chamber 8 above the plate 28. The plate is equipped with a passage opening 99 and thus acts as pulse establishing switch member. From the phase displacement between the pulses produced and the pulses of the transducers, the torsion of the flexible shaft is determined.

The neutron chopper described above and shown in the drawing has been successfully tested. The motor is brought up asynchronously to a speed of 4000 r.p.m. and shifted by frequency control to synchronous operation. With the rotor, pulses of thermal neutrons of a pulse frequency of between 200 and 1250 cycles per second are produced, in which connection neutron energies of between 1 mev. and 80 mev. can be selected.

The chopper housing has an overall height of about 92 cm. and a diameter at the bottom of about 50 cm. The flexible shaft has in its thin portion a diameter of 3 mm.; the corresponding length is 120 mm. The shaft consists of Cr-Ni-Va-steel. It is fastened by means of the half shells 100 and the screws 101 (bottom of FIGURE 1 and top of FIGURE 1A) to the connecting ends of the motor drive shaft and the rotor shaft. Special holding pins 102 extend radially into the heads of the flexible shaft.

The pair of locknuts 103 (FIGURE 1) above the upper coupling half shells secures the cap ring 58 and the fixed bearing 53 to the motor drive shaft while the locknuts 104 in the motor chamber secure the motor rotor to the drive shafts. The locknuts 105 (FIGURE 1A) secure the intercepting plate 28 to the rotor shaft 11 and at the same time form a stop for a tool for the raising of the lever.

The herein disclosed embodiment is given by way of illustration only and is not intended to be limitative of the scope of the invention which is equally applicable to all equivalents or obvious modifications of the said embodiment.

What is claimed is:

1. Apparatus for neutron selection comprising a neutron chopper, said chopper being formed by a rotor member mounted for rotation about a vertical axis, an electric motor for driving said rotor member, coupling means for drivingly connecting said rotor member to said electric motor, said coupling means and said rotor member being mounted within a gas tight housing, means for providing a vacuum within said housing, said coupling means comprising a vertically extending flexible shaft the lower end of which is drivingly connected ot said rotor member and the upper end of which is connected to said motor, said rotor member being suspendingly supported against downward displacement, cradle means engageable with a portion of said rotor member and being adapted to rotatably support said portion upon being engaged therewith, said portion of said rotor member being axially displaceable into engagement with said cradle means upon the occurrence of an interruption in the suspending support of said rotor member.

2. The apparatus of claim 1, wherein said rotor member is normally suspendingly supported entirely from said flexible shaft.

3. The apparatus of claim 1, wherein said cradle means includes a plurality of bearing elements normally spaced beneath respective axial portions of said rotor member.

4. The apparatus of claim 3, wherein said rotor member comprises a central body portion and an upper and a lower spindle extending therefrom, the upper spindle being drivingly connected to said flexible shaft and the lower spindle extending into a radial support means, said cradle means including three said bearing elements each respectively adapted to rotatively engage said upper spindle, said body portion, and said lower spindle.

5. The apparatus of claim 4, wherein a one of said bearing elements is comprised of a plate attached to said upper spindle and a bearing means mounted in said housing and surrounding said upper spindle, said plate being normally upwardly spaced from said bearing means.

6. The apparatus of claim 4, wherein a one of said bearing elements comprises a resilient collar mounted in said housing coaxially with said rotor member and beneath said body portion thereof, said collar having an upper rim spaced downwardly from the bottom of said body portion and adapted to rotatably engage said bottom of said body portion.

7. The apparatus of claim 4, wherein a one of said bearing elements comprises a seat member mounted in said housing in axial alignment with and spaced apart from the lower end face of said lower spindle, said seat member including a sliding surface for rotatably engaging the lower end face of said lower spindle.

8. The apparatus of claim 7, wherein said seat member is rotatably mounted in said housing.

9. The apparatus of claim 1, including an electric drive motor drivingly connected to the upper end of said flexible shaft and a phase-angle transmitter associated with said motor, said gas-tight housing being divided into four inter-communicating, vertically successive compartments, the lower of which encloses said rotor member, the next of which encloses said flexible shaft and the connections at the opposite ends thereof connecting said shaft to said motor and to said rotor member, the next of which encloses said motor, and the last of which encloses said phase-angle transmitter.

No references cited.

RALPH G. NILSON, *Primary Examiner.*

A. B. CROFT, *Assistant Examiner.*

U.S. Cl. X.R.

250—83.1